Figure 1:
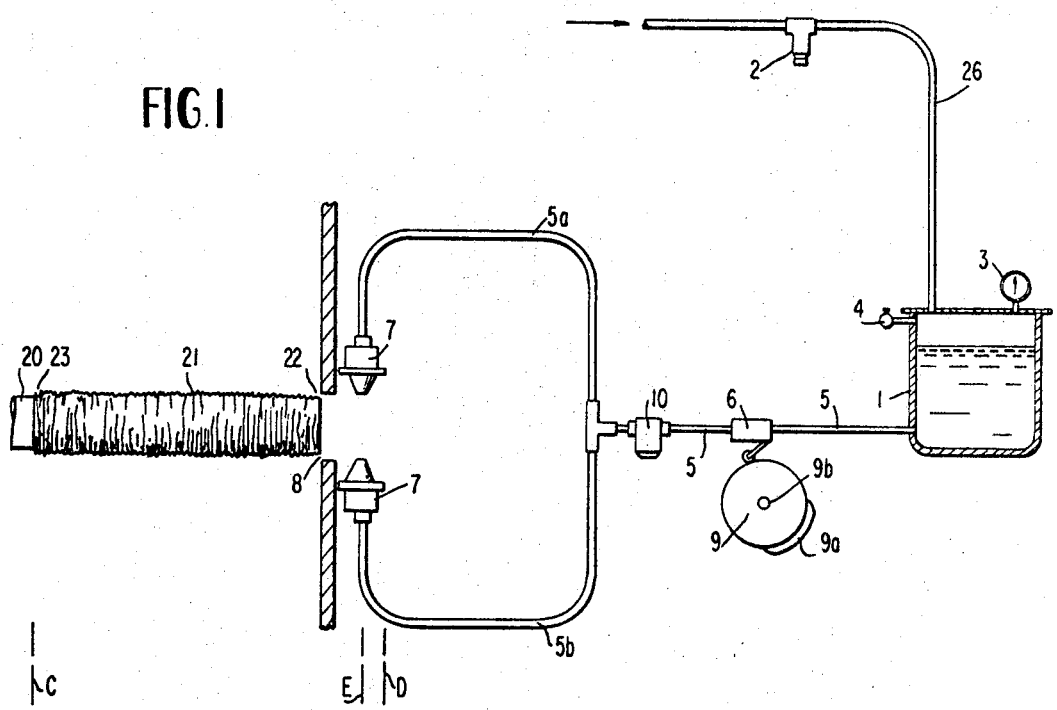

United States Patent

[11] 3,594,856

| [72] | Inventor | Horst Michl<br>Wallau Uber Wiesbaden, Germany |
|---|---|---|
| [21] | Appl. No. | 758,399 |
| [22] | Filed | Sept. 9, 1968 |
| [45] | Patented | July 27, 1971 |
| [73] | Assignee | Kalle Aktiengesellschaft<br>Wiesbaden-Biebrich, Germany |
| [32] | Priority | Mar. 9, 1967 |
| [33] | | Germany |
| [31] | | K 61 673 III/66b<br>Division of Ser. No. 710,935, Mar. 6, 1968, abandoned. |

[54] APPARATUS FOR MOISTENING ARTIFICIAL SAUSAGE CASINGS
5 Claims, 2 Drawing Figs.

[52] U.S. Cl. .................................................. 17/42,
137/624.17, 239/533

[51] Int. Cl. ........................................................ A22c 13/00
[50] Field of Search ............................................ 17/41, 42;
239/533, 545; 137/624.17

[56] References Cited
UNITED STATES PATENTS

| 2,548,324 | 4/1951 | Smith | 137/624.17 X |
| 3,115,669 | 12/1963 | Matecki | 17/42 |
| 3,266,911 | 8/1966 | Clement | 17/42 X |
| 3,327,950 | 6/1967 | Solomon | 239/533 |

*Primary Examiner*—Lucie H. Laudenslager
*Attorney*—James E. Bryan

ABSTRACT: This invention relates to an apparatus for moistening an artificial sausage casing. The apparatus includes at least two moistening nozzle means mounted at substantially equally spaced positions around the discharge end of a mandrel upon which a sausage casing to be moistened is shirred.

PATENTED JUL 27 1971 3,594,856

Inventor
HORST MICHL

By Bryan and Bistrow
Attorneys

APPARATUS FOR MOISTENING ARTIFICIAL SAUSAGE CASINGS

This application is a division of copending application Ser. No. 710,935, filed Mar. 6, 1968, now abandoned.

For use in modern sausage machines, artificial sausage casings, in particular shirred regenerated cellulose casings, must have a certain degree of moisture which should be constant over the entire length of the casing. It already has been suggested to impart this moisture to the sausage casings during their manufacture. This method has the drawback that it is difficult to maintain a constant moisture content during longer storage of the casings on the reel. Further, owing to the high extensibility of the regenerated cellulose casings in the wet state, permanent deformations of the casings may be caused by the shirring operation. The suggestion to moisten the sausage casings between uncoiling them from the feed reel and shirring also has some disadvantages. Above all, it is difficult to spray a large area with small quantities of a liquid, which should be constant per unit of time, because very small nozzle openings are necessary which tend to clog during practical use and thus may cause a breakdown. Moreover, with this method there is still the possibility that the highly extensible wet cellulose hydrate casings become permanently deformed. To ensure a trouble-free operation of the sausage machines, it is required that, in addition to a certain moisture content, the casings have a thin film of a lubricant on their outer surface. The quantities of lubricant to be applied are very small. With the methods hitherto known, a uniform distribution of such small quantities was not guaranteed.

The present invention provides a process which enables the required small quantities of liquid, either water or a lubricant, or both, to be evenly distributed over the entire sausage casing.

Principally, the process involves first shirring the artificial sausage casings and then spraying them with a moistening agent.

Water is used as the moistening agent. Paraffin oil (paraffinium liquidum) is preferred as a lubricant, but other lubricants, such as vegetable or animal oils, in particular oils or refined oils which do not harden under the influence of air, or glycerol, also may be used. According to a preferred embodiment of the invention, the shirred sausage casings are sprayed with an emulsion or mixture of water and a lubricant. Spraying is effected while the readily shirred sausage casings are discharged from the shirring apparatus.

The present invention has the advantage that the quantity of water or lubricant applied must be evenly distributed over a surface which corresponds only to about one-one hundredth of the surface of the unshirred sausage casings. Therefore, nozzles, sprays or other means of application, through which the moistening agents or lubricants are supplied, may possess considerably larger openings, so that they do not become clogged so easily.

The fact that only part of the surface of the sausage casing is directly wetted by the applicator device, is of minor importance. As is known, cellulose hydrate casings are very hygroscopic, so that water applied thereto is evenly accepted. Moreover, the fine gaps between the individual folds produced by shirring act as capillaries, so that not only water but also a lubricant applied are evenly distributed over the entire surface of the sausage casing within a short time. A wetting agent may be added to the moistening liquid, but as a rule this is not necessary.

The invention also provides an apparatus, which is attached to a known apparatus for shirring sausage casings over a mandrel and discharging the shirred portions of the casing over the end of the mandrel, the novel apparatus having at least two moistening nozzles which are mounted at equally spaced positions around the mandrel and are connected with a pressure reservoir from which the moistening agent is supplied to them under pressure. Moistening devices of this general type are known. In the apparatus of the invention, the nozzles are equally distributed around the opening at the discharge end of the mandrel, a control valve is provided in the pipe connecting the pressure reservoir with the nozzles, and a control mechanism is provided which causes the control valve to be kept open each time a shirred portion of the sausage casing is discharged and passes the nozzles.

Figure 2:
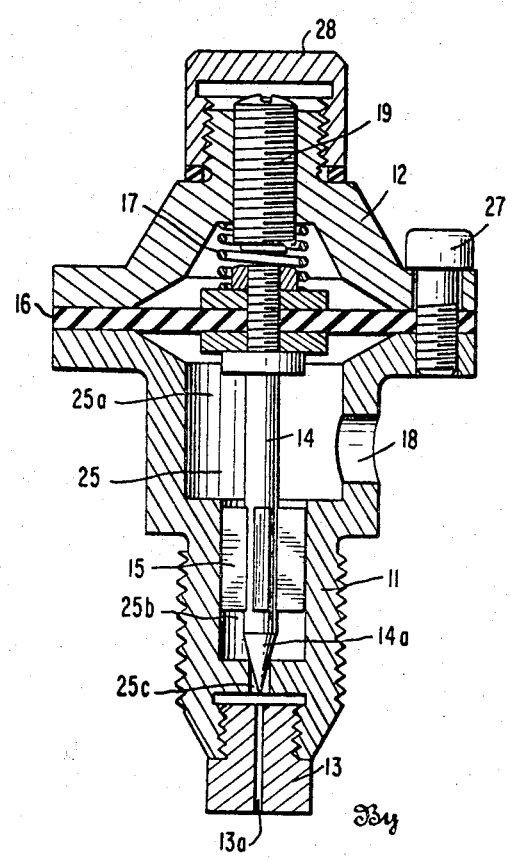

Referring to the accompanying drawings:

FIG. 1 shows one embodiment of the apparatus for performing the process of the invention, and FIG. 2 shows an advantageous embodiment of a nozzle for use in the apparatus.

In FIG. 1, the numeral I designates a container for water or a lubricant, or for a water-lubricant emulsion or mixture. The liquid is supplied under pressure to the container I through a pipe 26. A pressure-reducing valve 2 is provided in the pipe 26. A pressure gauge 3 indicates the pressure prevailing in the container 1, and 4 is a safety valve fitted to the container 1. The pipes 5, 5a, and 5b, connect the container 1 with the spray nozzles 7. A control valve 6, in the pipe 5, is actuated by the control disc 9. The filter 10 is within the pipe 5. The spray nozzles 7 are attached near the discharge end of the mandrel of the shirring apparatus and are equally distributed around the discharge opening. A press sleeve 20 is the means whereby the sausage casings are shirred on the mandrel and pushed over it. The shirred portion of a sausage casing is shown at 21, 22 being its front end and 23 the rear end.

Prior to the discharge operation, that part of the apparatus extending from the pressure-reducing valve 2 to the control valve 6 is under pressure as adjusted. That part of the apparatus downstream of the control valve 6 is filled with liquid, but is not under pressure. During the discharge operation, the press sleeve 20 of the shirring apparatus (not shown) covers the distance from C to D and thus pushes the stick of sausage casing over the discharge mandrel and out of the apparatus. When the front end 22 of the stick of sausage casing 21 has reached position E, the control valve 6 is actuated by the control disc 9 via control means (not shown), thus initiating the spraying operation. As soon as the rear end 23 of the sausage casing stick 21 has reached position E, the control valve 6 is closed again and the spraying operation is terminated. This is the end of one operation. The press sleeve 20 is retracted by the shirring apparatus and a new operation begins.

Since sausage casing sticks of different lengths can be discharged, it is necessary also that spraying periods of different duration can be provided. For this reason, the control disc 9, which is in the form of a cam plate provided with a cam 9a, consists of two identical halves mounted concentrically on the shaft 9b. When the spraying operation is to be extended, the two halves of the control disc 9 are turned relative to each other so that the cam 9a is elongated.

A particularly suitable nozzle for the apparatus shown in FIG. 1 is the nozzle shown in FIG. 2. The nozzles consist of a lower part 11 and an upper part 12 which are secured together by the screws 27. A diaphragm 16 of elastic material, e.g. rubber, which carries the tapered pin 14, is clamped between the parts 11 and 12. The bore 25 in the lower part 11 tapers in three steps between the diaphragm 16 and its free end. In the sidewall of the widest upper step 25a, the supply duct 18 for the liquid is provided. In the middle step 25b, the tapered pin 14 is guided by the fins 15 which are attached to it and fit the sidewalls of the bore. As long as the valve is closed, the conical side faces of the tip 14a of the tapered pin 14 seat on the upper edge of the lower, narrowest step 25c of the bore 25. The nozzle head 13 is screwed into the free end of the lower part 11; its aperture 13a corresponds to the desired rate of flow. Into the upper part 12, an adjusting screw 19 is threaded which serves as a stop for the tapered pin 14, so that the rise of the tapered pin may be altered. The numeral 27 designates the screws by which the two parts of the nozzle are joined together, and 28 is a screwcap threaded onto the top of the upper part.

When the control valve 6 has been opened by the control disc 9, the liquid enters the bore 25 through the duct 18 and pushes the diaphragm 16 upwards. Thereby, the tip 14a of the tapered pin 14 is lifted from the upper edge of the step 25c of the bore and the liquid is sprayed from the nozzle 13 onto the sausage casing. When the control disc 9 closes the valve 6 again, the tip of the tapered pin 14 is at once pushed back onto the upper edge of the step 25c by the coil spring 17 and the diaphragm 16. Thus, the nozzle can not drip.

The quantity of liquid to be applied varies with the size of the sausage casings. A change in the quantity of liquid applied may be effected either by replacing the nozzle head 13, or, within a certain range, by lifting the tapered pin 14 higher or lower, so that a larger or smaller cross-sectional area is opened.

When it is desired to apply water and lubricant separately to the sausage casing, two of the moistening devices described, each consisting of at least two nozzles, may be mounted one after the other at the discharge end of the mandrel. However, when both kinds of moistening agent are to be applied, it is more advantageous and, therefore, in almost all cases preferable, to apply an emulsion or a mixture of water and lubricant.

In the case of shirring apparatuses with shirring means that shirr the sausage casings in a very gentle manner, the desired water content of the sausage casings also may be adjusted before shirring. In such cases, the casings are moistened only with a lubricant in accordance with the present invention.

It will be obvious to those skilled in the art that many modifications may be made within the scope of the present invention without departing from the spirit thereof, and the invention includes all such modifications.

What I claim is:

1. An apparatus for moistening a shirred sausage casing on a mandrel which comprises at least two moistening nozzle means mounted at substantially equally spaced positions around a discharge end of the mandrel, a conduit connecting the nozzle means with a supply of moistening agent, control valve means in the conduit, and means for actuating the control valve means each time a shirred portion of sausage casing passes the nozzle means.

2. An apparatus according to claim 1 in which the means for actuating the control valve means comprises a control disc having two parts which are adjustable relative to each other whereby the duration of opening of the control valve may be varied.

3. An apparatus according to claim 1 in which the nozzle means comprises a bored first portion, a hollow second portion, diaphragm means secured between the portions, tapered pin means secured to the diaphragm means, and aperture means in the first portion in which the pin means is adapted to seat.

4. An apparatus according to claim 3 in which the bored first portion has three sections of different internal diameter and includes duct means in the sidewall of the section of greatest diameter, guiding fin means in the section of intermediate diameter, and the section of least diameter forming the seat for the tapered portion of the pin means.

5. An apparatus according to claim 4 including nozzle head means mounted at the end of the bored first portion.